United States Patent
Lares

(10) Patent No.: US 7,284,302 B2
(45) Date of Patent: Oct. 23, 2007

(54) BAND CLAMP

(75) Inventor: Joseph G. Lares, Barnegat, NJ (US)

(73) Assignee: Heyco, Inc., Toms River, NJ (US)

( * ) Notice: Subject to any disclaimer, the term of this patent is extended or adjusted under 35 U.S.C. 154(b) by 35 days.

(21) Appl. No.: 11/017,990

(22) Filed: Dec. 21, 2004

(65) Prior Publication Data

US 2006/0130285 A1 Jun. 22, 2006

(51) Int. Cl.
*F16L 33/00* (2006.01)
*F16L 33/035* (2006.01)
*F16L 33/02* (2006.01)

(52) U.S. Cl. .................. 24/16 PB; 24/20 TT; 248/74.3

(58) Field of Classification Search ............. 24/20 TT; 248/74.3, 74.2, 74.4; 285/252, 254
See application file for complete search history.

(56) References Cited

U.S. PATENT DOCUMENTS

| | | | |
|---|---|---|---|
| 3,913,187 A | 10/1975 | Okuda | |
| 4,372,011 A | 2/1983 | Aranyos | |
| 4,439,902 A | 4/1984 | Huxtable | |
| 4,612,680 A * | 9/1986 | Daiguji | 248/74.3 |
| 5,020,749 A * | 6/1991 | Kraus | 24/16 PB |
| 5,148,576 A | 9/1992 | Dyer | |
| 5,251,857 A | 10/1993 | Grice et al. | |
| 5,423,501 A | 6/1995 | Yu | |

* cited by examiner

*Primary Examiner*—Robert J. Sandy
(74) *Attorney, Agent, or Firm*—Greenberg Traurig, LLP

(57) ABSTRACT

A band clamp can be movably applied to an elongated object, such as a hose, conduit or the like, when the band clamp is in an open or non-engaged position. In one embodiment, the elongated object is gripped between a pair of arms which project inwardly from opposite sides of an inner circumferential surface of the band when the band is in its open or non-engaged position. The inner circumferential surface of the band also includes a pair of recesses, one on each side thereof. When the band is in its closed or engaged position, each of the arms is received in a corresponding recess. The first and second arms are attached at a common junction with the band forming an arc that is no less than about 180°.

18 Claims, 3 Drawing Sheets

BAND CLAMP

FIELD OF THE INVENTION

The present invention relates to band clamps and, more particularly, to a band clamp for grasping an elongated object along the length thereof, e.g., for securing a hose to a nipple-type fitting.

BACKGROUND OF THE INVENTION

Band clamps for grasping and/or compressing an elongated object, such as a conduit, wire bundle, or hose are known in the art. One common type of band clamp is disclosed in U.S. Pat. No. 5,423,501 to Yu, which discloses a generally annular open-ended band, the free ends of which have interlocking elements. After the band clamp is properly positioned on a conduit, the free ends are urged together whereupon the band clamp constricts about the conduit and the interlocking elements become engaged to prevent the band clamp from loosening.

The prior art hose clamps, e.g., like those described in the Yu '501 Patent, cannot grasp the object strongly enough to be retained on the elongated object without closing the clamp. As a result, they are not capable of being temporarily applied to an elongated object while in their open position (e.g., for transportation to a job site prior to actual installation).

SUMMARY OF THE INVENTION

The present invention overcomes the disadvantages and shortcomings of the prior art discussed above by providing a band clamp that includes a band forming a loop and having a radially expanded (i.e., disengaged) position and a radially constricted (i.e., engaged) position. At least one arm is biased inwardly relative to the band for frictionally engaging an elongated object disposed within the loop of the band when the band is in its expanded position.

The clamp, when installed on an elongated object (e.g., a hose) in its radially expanded position, can be properly positioned relative to the end of the elongated object so as to frictionally grip the elongated object tightly enough to retain the clamp in a selected position yet not so tight that the clamp's position cannot be adjusted. This allows the clamp to be assembled to, for instance, a while the clamp is disengaged. After shipping the resulting assembly to a jobsite, the clamp can be repositioned without removing it from the hose and then engaged to attach the hose to a mating structure, such as a mechanical fitting or the like, thereby facilitating both transportation and installation of the clamp.

In one embodiment, the elongated object is gripped between a pair of arms which project inwardly from opposite sides of an inner circumferential surface of the band when the band is in its open or non-engaged position. The inner circumferential surface of the band also includes a pair of recesses, one on each side thereof. When the band is in its closed or engaged position, each of the arms is received in a corresponding recess. Further features and advantages of the invention will appear more clearly on a reading of the following detailed description of an exemplary embodiment of the invention.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE INVENTION

Although the present invention can be used in conjunction with any type of hose, conduit, wire bundle, or the like, it is particularly suitable for use as a hose fitting. Accordingly, the present invention will be described hereinafter as such. It should be understood, however, that the following description is only meant to be illustrative of the present invention and is not meant to limit the scope of the present invention, which has applicability for grasping and/or clamping other types of elongated objects.

Figure 1:
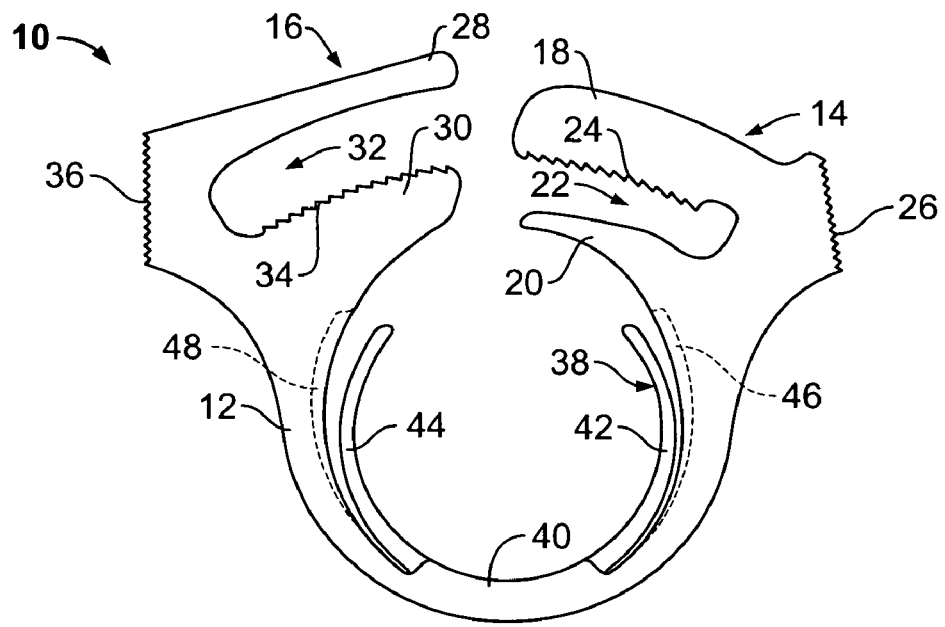
FIG. 1 is an elevational view of a disengaged band clamp constructed in accordance with an exemplary embodiment of the present invention.
Figure 2:
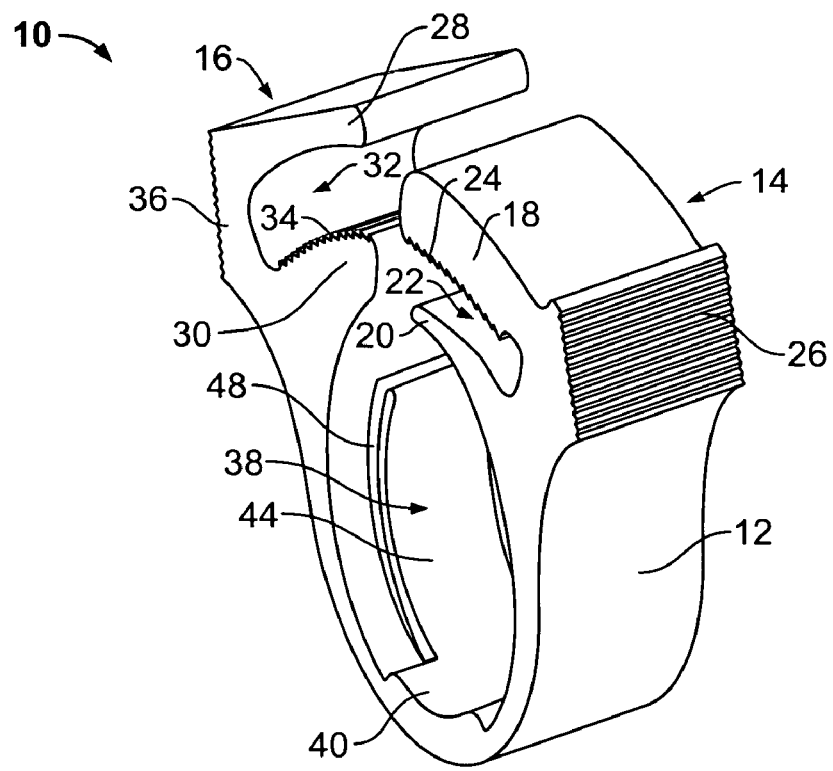
FIG. 2 is a perspective view of the band clamp of FIG. 1.

With reference to FIGS. 1 and 2, a band clamp 10, preferably made of a plastic, such as nylon, and manufactured via injection molding, includes an outer band 12 in the form of an open-ended loop and having complementary, interlocking closure members 14, 16 provided at adjacent ends of the outer band 12. The closure member 14 has an upper tongue 18 and a lower jaw 20 which cooperate with each other to form an elongated, open-ended cavity 22 therebetween. The closure member 16 has an upper tongue 28 and a lower jaw 30 which cooperate with each other to form an elongated, open-ended cavity 32 therebetween. The upper tongue 18 and the lower jaw 30 are somewhat thicker in the radial direction than the lower jaw 20 and the upper tongue 28 so as to maximize clamping force when the interlocking closure members 14, 16 are engaged as will be described hereinafter. The thicker members (i.e., the upper tongue 18 and the lower jaw 30) serve to constrain the clamp 10 in the radial direction, while the thinner members (i.e., the lower jaw 20 and the upper tongue 28) act as guides and supports for the thicker members.

Rows of teeth 24, 34 are formed on the lower surface of the upper tongue 18 and the upper surface of the lower jaw 30, respectively. The teeth 24, 34 have any mating, interlocking shape, e.g., a generally triangular shape, and may have a directionality and/or shape that permits relative overriding in the locking direction and resists overriding in the unlocking direction, e.g., the teeth 24, 34 may point into the open-ended cavities 22, 32, respectively. The teeth 24, 34 are formed of intersecting surfaces which define an acute angle relative to the direction of locking movement and are inclined relative to the jaws 20, 30, respectively, so that the upper tongue 18 and the lower jaw 30 can slide relative to one another toward a locking position, but then lock against movement in an opposite direction.

Finger grip pads 26, 36 are integrally formed on the closure members 14, 16, respectively, distal to the cavities 22, 32. The grip pads 26, 36 provide anti-slip surfaces for receiving the opposed thumb and finger of a human hand or the opposed jaws of a tool, such as a pair of pliers; and, therefore, they aid in closing and locking the band clamp 10.

The upper tongue 18 of the closure member 14 is sized and shaped to fit snugly into the open-ended cavity 32 of the closure member 16 between the upper tongue 28 and the lower jaw 30. Likewise, the lower jaw 30 of the closure member 16 is sized and shaped to fit snugly into the open-ended cavity 22 of the closure member 14 between the upper tongue 18 and the lower jaw 20.

A generally C-shaped inner band 38, having flexible arms 42, 44, is attached to the inner diameter of the outer band 12 at a junction area 40 such that the inner band 38 is substantially concentric with the outer band 12. The arms 42, 44 extend in opposite directions from the junction area 40 in a cantilevered fashion. Recesses 46, 48 are provided in the outer band 12 adjacent to the arms 42, 44, respectively, for a purpose to be described hereinafter.

In the embodiment shown, the junction area 40 has a width that is equal to that of the outer band 12, but the arms 42, 44 are narrower. Controlling the dimensions of the arms 42, 44 provides a selected resistance to bending and associated grip strength. Preferably, the inner band 38 subtends an arc that is greater than or equal to about 180°. The arms 42, 44 have a relaxed inner diameter slightly less than the outer diameter of the elongated object on which the clamp 10 is to be installed, e.g., a hose. In this manner, the arms 42, 44 may grip the elongated object lightly to hold the clamp 10 in position on the elongated object prior to compressing the clamp 10 into its closed (i.e., engaged) position. In applications where clamp position adjustments are anticipated, the grip is preferably strong enough to retain the clamp 10 on the hose at a selected position during handling operations prior to closure of the clamp 10, but not strongly enough to prevent repositioning the clamp 10 on the hose, if necessary, by, for instance, sliding the clamp 10 along the length of the hose. The present invention permits clamp repositioning without tools and without adjusting the closure members 14, 16. This function is described below in reference to FIGS. 3-6 and in the context of using the clamp 10 for clamping a hose 50 to a nipple-type fitting 52.

Upon compressing the band clamp 10 inwardly, the closure members 14, 16 engage and lock, closing the outer band 12 snugly around the hose 50. Upon closing the outer band 12, the C-shaped inner band 38 may flex to assume a smaller circumference, while the arms 42, 44 are wholly or partially received in their respective recesses 46, 48. The arms 42, 44 may be dimensioned to "bottom-out" in the recesses 46, 48 such that the inner surfaces thereof exert compressive force against the hose 50. Alternatively, if the outer band 12 does not force the arms 42, 44 inwardly through contact with the recesses 46, 48, the arms 42, 44 will still exert their original grip when the outer band 12 is in its closed position. In both instances, the arms 42, 44 exert a gripping force before, during, and after closure, as well as when the clamp 10 is released from closure, to grip the elongated object of interest (i.e., the nipple-type fitting 52).

Figure 3:
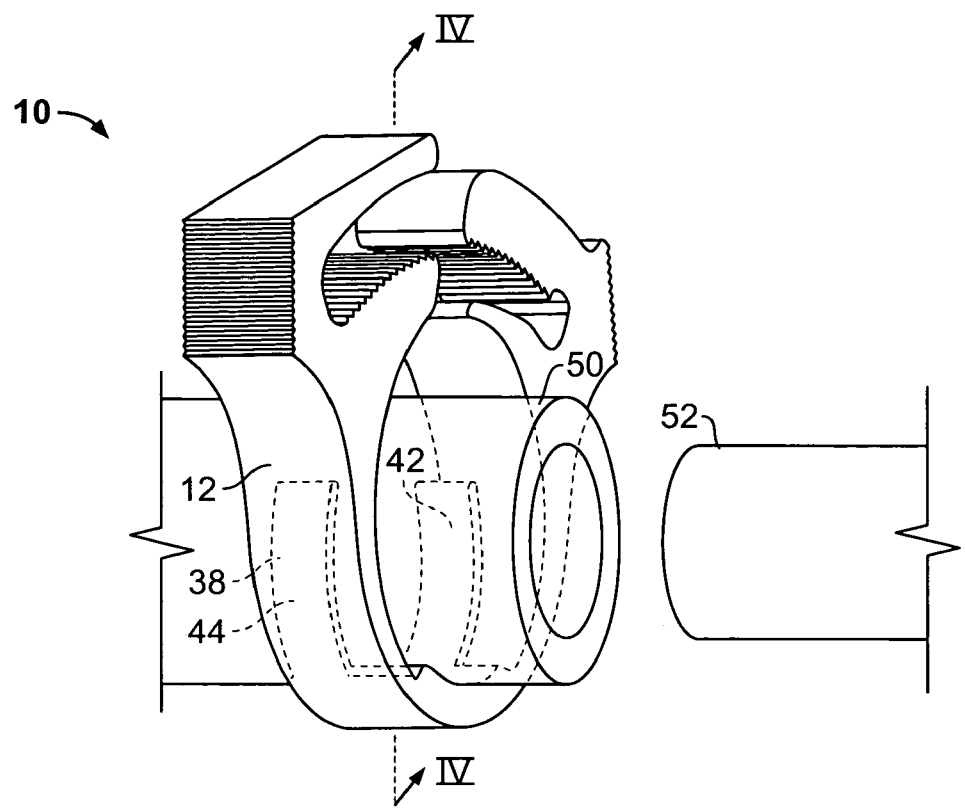
FIG. 3 is a perspective view showing the band clamp of FIG. 1 disposed on a hose with its outer band in a disengaged state.
Figure 4:
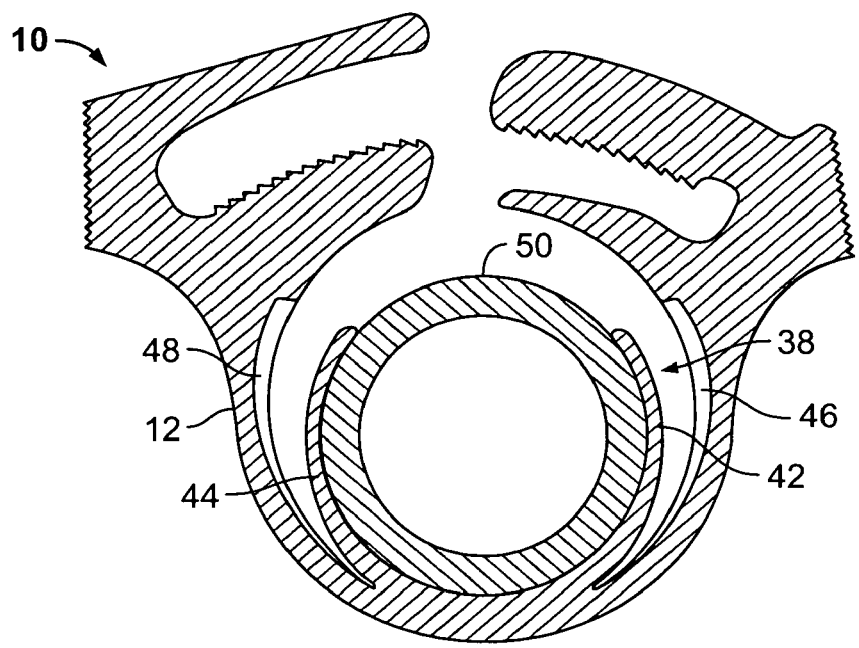
FIG. 4 is a cross-sectional view of the clamp and hose shown in FIG. 3 taken along section line IV-IV and looking in the direction of the arrows.

Now referring to FIGS. 3 and 4, the band clamp 10 is shown applied to the hose 50 prior to the hose's attachment to the fitting 52 (e.g., before transportation to a job site to simplify installing the hose 50 at the job site). The arms 42, 44 flex somewhat, such that the generally C-shaped inner band 38 contacts the outer circumference of the hose 50, conforming to the shape of the hose 50 and exerting an inwardly directed grip on the hose 50. The clamp 10 may then be properly positioned relative to the end of the hose 50, e.g., to facilitate installation of the hose 50 on the nipple-type fitting 52. The arms 42, 44 are sized and shaped so as to frictionally grip the hose 50 tightly enough to retain the clamp 10 in a selected position on the hose 50, yet not so tightly that the clamp's position cannot be adjusted. Accordingly, the arms 42, 44 prevent the clamp 10 from falling off or sliding down the hose 50. The length of the arc traced by the arms 42, 44, and junction area 40, along with the thickness and width of the arms 42, 44, can be selected such that the arms 42, 44 exert a desired grip strength on the hose 50 that is optimal for a particular application.

Figure 5:
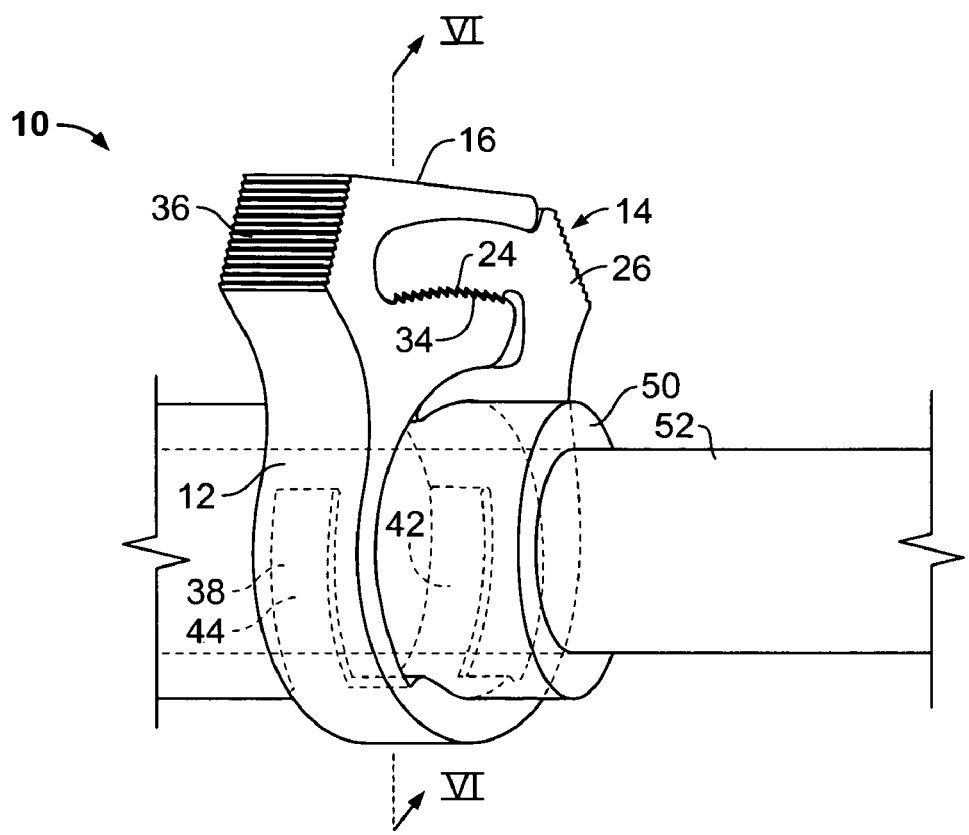
FIG. 5 is a perspective view of the clamp of FIGS. 1-4 in its engaged state while securing a hose on a nipple-type fitting.
Figure 6:
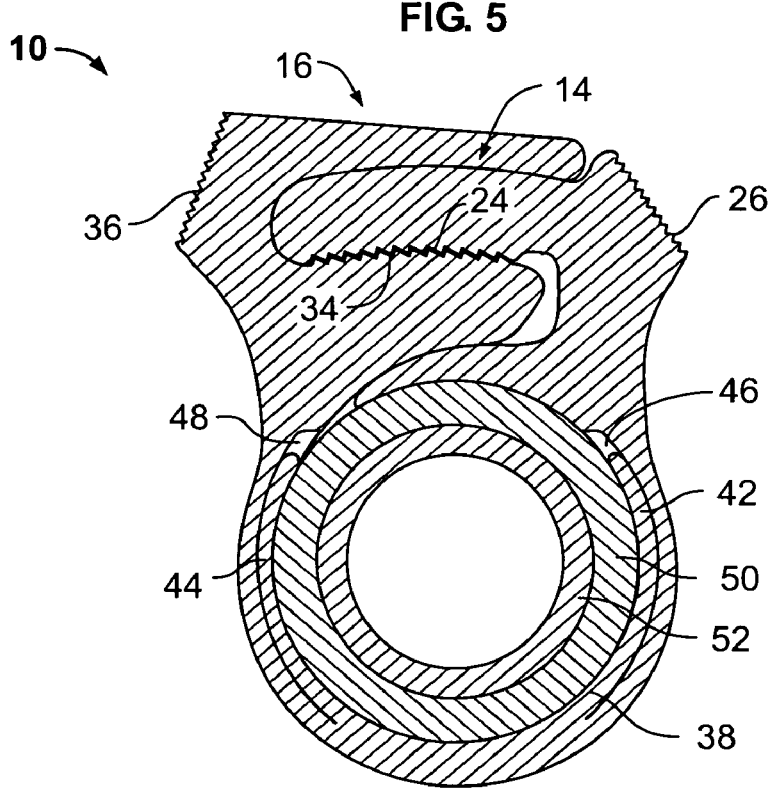
FIG. 6 is a cross-sectional view of the clamp, hose, and fitting of FIG. 5 taken along section line VI-VI and looking in the direction of the arrows.

FIGS. 5 and 6 show the clamp 10 in position on the fitting 52. The finger grip pads 26, 36 are pushed towards each other with the closure members 14, 16 engaged and teeth 24, 34 interlocked, thereby securing the hose 50 to the nipple-type fitting 52. The arm 42 is received in the recess 46, while the arm 44 is received in the recess 48, such that the arms 42, 44 lie flush with the inner edges of the outer band 12. In this way, a generally uniform inwardly-directed circumferential pressure is applied to the hose 50 and the nipple-type fitting 52.

The band clamp 10 of the present invention has several advantages over prior art hose clamps. The gripping capability of the C-shaped inner band 38 to the elongated object (e.g., the hose 50) prior to engagement of the closure members 14, 16 simplifies later installation and thus reduces installation cost. For example, the clamp 10 of the present invention can be fastened to an elongated object with the clamp 10 in its open position, prepackaged, and then transported to a job site, where the hose 50 is installed and the clamp 10 closed.

The band clamp 10 of the present invention is susceptible to numerous modifications and variations. For instance, the circumferential length and the width of the arms 42, 44 can be varied, with the width ranging from a width substantially less than that of the outer band 12 up to or exceeding the width of the outer band 12. Preferably, the arms 42, 44 have a width between about 25% and 75% of the width of the outer band 12 so that the clamp 10 has optimal gripping capability before being compressed to a closed position. The dimensions of the recesses 46, 48 can be similarly varied or they can be eliminated entirely. A single arm 42 can be used instead of two for gripping an elongated object prior to engaging the clamp 10, viz., by trapping the elongated object between the arm 42 and the inner wall of the outer band 12. A similar function can be achieved if the free end of one of the arms 42, 44, is attached to a portion of the outer band 12 to approximate a chord of the circle formed by the outer band 12 when the clamp 10 is engaged. The inner C-shaped band 38 can be formed of a discrete piece (i.e., not integrally formed with the outer band 12 via the junction area 40) that is attached to the outer band 12 by a rivet, glue, or by a metal band crimped around the inner C-shaped band 38 and the outer band 12. The ends of the loop forming the clamp 10 can be engaged using a conventional screw-type adjuster instead of employing complementary closure members 14, 16. While the present invention has been described above as being made of plastic, it could be made of metal in the manner of a conventional hose clamp. All such variations and modifications are intended to be included within the scope of the present invention as defined in the appended claims.

What is claimed is:

1. A band clamp, comprising a band forming a loop and having a radially expanded position and a radially constricted position; retaining means for retaining said band in its said constricted position; a first flexible arm biased inwardly relative to said band from one side of said band and a second flexible arm biased inwardly relative to said band from an opposite side of said band, said second arm cooperating with said first arm to frictionally engage and movably grip an elongated object disposed within said loop of said band when said band is in its said expanded position; a first recess formed in said one side of said band, said first recess being sized and shaped to receive said first arm when said band is in its said constricted position; and a second recess formed in said opposite side of said band, said second recess being sized and shaped to receive said second arm when said band is in its said constricted position.

2. The band clamp of claim 1, wherein each of said first and second arms has an arcuate shape.

3. The band clamp of claim 1, wherein said first and said second arms extend radially inward relative to said band from a common junction with said band, said arms extending from opposite sides of said junction in a cantilevered fashion.

4. The band clamp of claim 3, wherein said first and said second arms cooperate with said common junction to form an arc that is not less than about 180°.

5. The band clamp of claim 4, wherein said arc is generally concentric with said loop.

6. The band clamp of claim 1, wherein said band, said first arm, and said second arm are integrally formed.

7. The band clamp of claim 6, wherein said band clamp is injection molded.

8. The band clamp of claim 1, wherein each of said first and second recesses has a width that is less than the width of said band.

9. The band clamp of claim 8, wherein each of said first and second recesses has a depth that is less than the thickness of said band.

10. The band claim of claim 9, wherein said first arm has a thickness that is substantially the same as the depth of said first recess and wherein said second arm has a thickness that is substantially the same as the depth of said second recess.

11. The band clamp of claim 1, wherein said band clamp has a pair of adjacent free ends when said band is in its said expanded position.

12. The band clamp of claim 11, wherein said retaining means includes complementary closure members provided on said ends of said band, said closure members being interlockable with each other when said band is in its said constricted position.

13. A band clamp, comprising a band forming a loop and having a radially expanded position and a radially constricted position; retaining means for retaining said band in its said constricted position; a first flexible arm having an arcuate shape and biased inwardly relative to said band from one side of said band; a second flexible arm having an arcuate shape and biased inwardly relative to said band from an opposite side of said band, each of said first and second arms extends radially inward relative to said band for frictionally engaging an elongated object disposed within said loop of said band when said band is in its said expanded position, said each of first and second arms projects in a cantilevered fashion from a common junction with said band and cooperates with said junction to form an arc that is not less than about 180°.

14. A band clamp, comprising a band forming a loop and having a radially expanded position and a radially constricted position; retaining means for retaining said band in its said constricted position; a first flexible arm having an arcuate shape and biased inwardly relative to said band from one side of said band; a second flexible arm having an arcuate shape and biased inwardly relative to said band from an opposite side of said band, each of said first and second arms extends radially inward relative to said band for frictionally engaging an elongated object disposed within said loop of said band when said band is in its said expanded position, said each of first and second arms projects in a cantilevered fashion from a common junction with said band and cooperates with said junction to form an arc that is generally concentric with said loop and is not less than about 180°.

15. A band clamp, comprising a band forming a loop and having a radially expanded position and a radially constricted position; retaining means for retaining said band in its said constricted position; a first flexible arm biased inwardly relative to said band from one side of said band; a second flexible arm biased inwardly relative to said band from an opposite side of said band, each of said first and second arms extending radially inward relative to said band for frictionally engaging an elongated object disposed within said loop of said band when said band is in its said expanded position; a first recess formed in said one side of said band, said first recess being sized and shaped to receive said first arm when said band is in its said constricted position, and a second recess formed in said opposite side of said band, said second recess being sized and shaped to receive said second arm when said band is in its said constricted position.

16. The band clamp of claim 15, wherein each of said first and second recesses has a width that is less than the width of said band.

17. The band clamp of claim 16, wherein each of said first and second recesses has a depth that is less than the thickness of said band.

18. The band clamp of claim 17, wherein said first arm has a thickness that is substantially the same as the depth of said first recess and wherein said second arm has a thickness that is substantially the same as the depth of said second recess.

* * * * *